(12) United States Patent
Ikeda

(10) Patent No.: US 8,872,956 B2
(45) Date of Patent: Oct. 28, 2014

(54) ELECTRONIC CAMERA WITH SELF-EXPLANATION/DIAGNOSIS MODE

(75) Inventor: Osamu Ikeda, Yokohama (JP)

(73) Assignee: Nikon Corporation, Tokyo (JP)

( * ) Notice: Subject to any disclaimer, the term of this patent is extended or adjusted under 35 U.S.C. 154(b) by 52 days.

(21) Appl. No.: 13/159,019

(22) Filed: Jun. 13, 2011

(65) Prior Publication Data

US 2011/0242329 A1   Oct. 6, 2011

Related U.S. Application Data

(63) Continuation of application No. 12/320,083, filed on Jan. 16, 2009, now abandoned, which is a continuation of application No. 11/139,603, filed on May 31, 2005, now abandoned, which is a continuation of application No. 09/002,349, filed on Jan. 2, 1998, now abandoned.

(30) Foreign Application Priority Data

Jan. 9, 1997  (JP) .................................... 09-001866
Jan. 23, 1997  (JP) .................................... 09-010154

(51) Int. Cl.
| | |
|---|---|
| *H04N 5/222* | (2006.01) |
| *H04N 17/00* | (2006.01) |
| *H04N 5/232* | (2006.01) |
| *G11B 31/00* | (2006.01) |
| *H04N 1/21* | (2006.01) |
| *H04N 5/77* | (2006.01) |
| *H04N 5/76* | (2006.01) |
| *H04N 5/85* | (2006.01) |
| *H04N 21/47* | (2011.01) |
| *H04N 101/00* | (2006.01) |

(52) U.S. Cl.
CPC .............. *G11B 31/006* (2013.01); *H04N 17/00* (2013.01); *H04N 5/232* (2013.01); *H04N 5/85* (2013.01); *H04N 21/47* (2013.01); *H04N 2101/00* (2013.01); *H04N 17/002* (2013.01); *H04N 1/2112* (2013.01); *H04N 5/23293* (2013.01); *H04N 5/772* (2013.01)
USPC .................................. 348/333.02; 348/231.99

(58) Field of Classification Search
USPC ............. 348/333.01, 333.02, 333.04, 231.99; 396/536
See application file for complete search history.

(56) References Cited

U.S. PATENT DOCUMENTS

| | | |
|---|---|---|
| 4,316,656 A | 2/1982 | Ishibashi et al. |
| 4,901,364 A | 2/1990 | Faulkerson et al. |

(Continued)

FOREIGN PATENT DOCUMENTS

| | | |
|---|---|---|
| JP | 57-194695 | 11/1982 |
| JP | 61-148974 | 7/1986 |

(Continued)

*Primary Examiner* — Kelly L Jerabek
(74) *Attorney, Agent, or Firm* — Morgan, Lewis & Bockius LLP

(57) ABSTRACT

An electronic camera having a plurality of functions including capturing and recording images is provided. The electronic camera includes an operation input unit for inputting external operations that designate corresponding functions of the camera to be performed, an image pickup unit for capturing the image of an object, and a recorder for recording the image captured by the image pickup unit. The electronic camera further includes a playback unit for at least playing back image information that is recorded on the recording medium and a mode selector for selecting one operation mode of the camera from a plurality of available operation modes that include an operation explanation mode. If the operation explanation mode is selected at the mode selector, the playback unit plays back an operation guide that is prestored in a memory, the operation guide explaining at least one of the camera operations and functions thereof.

10 Claims, 12 Drawing Sheets

(56) References Cited

U.S. PATENT DOCUMENTS

| | | | |
|---|---|---|---|
| 4,992,866 A | | 2/1991 | Morgan |
| 5,604,682 A | * | 2/1997 | McLaughlin et al. ........ 709/219 |
| 5,633,678 A | | 5/1997 | Parulski et al. |
| 5,689,742 A | | 11/1997 | Chamberlain, IV |
| 5,710,898 A | | 1/1998 | Tozuka |
| 5,752,114 A | * | 5/1998 | Saito et al. .................... 396/429 |
| 5,790,094 A | | 8/1998 | Tanigawa et al. |
| 5,894,326 A | | 4/1999 | McIntyre et al. |
| 5,978,016 A | | 11/1999 | Lourette et al. |
| 5,999,213 A | | 12/1999 | Tsushima et al. |

FOREIGN PATENT DOCUMENTS

| | | |
|---|---|---|
| JP | 02-137166 | 5/1990 |
| JP | 02-146873 | 6/1990 |
| JP | 04-317281 | 11/1992 |
| JP | 05-022682 | 1/1993 |
| JP | 05-281809 | 10/1993 |
| JP | 07-093175 | 4/1995 |
| JP | 07-253779 | 10/1995 |
| JP | 08-051650 | 2/1996 |
| JP | 08-079803 | 3/1996 |
| JP | 06-185250 | 7/1996 |

* cited by examiner

ELECTRONIC CAMERA WITH SELF-EXPLANATION/DIAGNOSIS MODE

This application is a Continuation of U.S. patent application Ser. No. 12/320,083 filed Jan. 16, 2009 now abandoned, which is a Continuation of U.S. patent application Ser. No. 11/139,603 filed May 31, 2005 now abandoned, which is a Continuation of U.S. patent application Ser. No. 09/002,349 filed Jan. 2, 1998 now abandoned and claims the benefit of Japanese Patent Applications No. 09-001866 filed in Japan on Jan. 9, 1997, and No. 09-010154 filed in Japan on Jan. 23, 1997, all of which are hereby incorporated by reference.

BACKGROUND OF THE INVENTION

1. Field of the Invention

The present invention relates to an electronic camera, and more particularly, to an electronic camera that has an operation instruction mode and/or a diagnostics mode.

2. Discussion of the Related Art

In general, electronic cameras record still images and/or moving images using image pickup devices. In particular, digital cameras are popular among a wide range of users because they are easy to use for taking pictures due to the fact that digital cameras do not require film developing processes, which are necessary for conventional cameras employing silver-halide films.

The fact that digital cameras are accepted by a wide range of users implies that there is increasing use of the electronic camera by those who are inexperienced with not only operation of a camera but also mechanical operations in general.

In order to learn how to operate a camera, it is often necessary to read the operation manual. However, operation manuals are hard to understand and operators have to locate the necessary information in the operation manual every time they need help. Therefore, learning camera operations takes effort and time for those who are inexperienced with mechanical operations in general.

In addition, taking pictures is frequently conducted outdoors, and therefore users sometimes find themselves in a situation where they have to carry the operation manuals with them all the time until they gain the necessary familiarity with the camera's operations.

Furthermore, current electronic cameras that record moving images have not only functions for taking and displaying pictures but also advanced image-editing functions. In these electronic cameras, the number of operation buttons increases as the complexity and sophistication of the functions increase. Therefore, the operation of the camera is becoming even more difficult. Thus, learning camera's complicated and sophisticated functions takes an even longer time.

Some other aspects of electronic cameras are discussed below. In general, an electronic camera not only records photographic images but also processes and edits photographic images. Because of this, there are a wide variety of usages for electronic cameras, and opportunities for using electronic cameras for photographic purposes instead of silver-halide cameras are increasing. For example, electronic cameras are used for picture-taking on family trips and at school events. Since there is no second chance to take pictures for these trips and school events, camera users tend to feel anxious about whether the camera is working properly.

To cope with this issue, conventional electronic cameras are equipped with a liquid crystal display (LCD) screen so that operators can check the image during and/or after picture taking. However, with this limited confirmation of camera operations during and/or after the photo shooting, there is a large possibility that even if the camera is broken, a user does not notice the problem and starts shooting pictures.

Idealistically, it is desirable that users check the camera every time they take pictures by conducting a test shooting before they actually start taking pictures to ensure the proper operation of the camera. In reality, however, this is a very cumbersome task. Moreover, even when the camera appears to be normally operating, malfunctions are occurring. In general, it is difficult for the operator to judge whether all the functions of the camera are working properly.

SUMMARY OF THE INVENTION

Accordingly, the present invention is directed to an electronic camera that substantially obviates one or more of the problems due to limitations and disadvantages of the related art.

An object of the present invention is to provide an electronic camera that allows users easily and quickly to understand the functions of the camera and makes advanced functions of the camera easy to learn for users.

Another object of the present invention is to provide an electronic camera that makes it possible to eliminate the trouble associated to a switching operation between an operation instruction mode and a normal use mode.

A further object of the present invention is to provide an electronic camera that is capable of checking each function of the camera easily and accurately.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides an electronic camera having a plurality of functions including capturing and recording images, the electronic camera including an operation input unit for inputting external operations that designate corresponding functions of the camera to be performed; an image pickup unit for capturing the image of an object; a recorder for recording the image captured by the image pickup unit on a recording medium; a playback unit for at least playing back image information that is recorded on the recording medium; and a mode selector for selecting one operation mode of the camera from a plurality of available operation modes that include an operation explanation mode, wherein if the operation explanation mode is selected at the mode selector, the playback unit plays back an operation guide that is pre-stored in a memory, the operation guide explaining at least one of the camera operations and functions thereof.

In another aspect, the present invention provides an electronic camera, including an image pickup unit for capturing the image of an object; a recorder for recording the image captured by the image pickup unit on a recording medium; a playback unit for at least playing back image information that is recorded on the recording medium; a mode selector for selecting a function diagnosis mode; and a function tester for testing functions of the camera if the function diagnosis mode is selected by the mode selector.

In another aspect, the present invention provides an electronic camera having a plurality of functions including capturing and recording images, the electronic camera including a mode selector externally switchable to select one of a function diagnosis mode and a normal mode; an operation input unit for inputting external operations that initiate corresponding functions of the camera while the camera is in the normal mode; an image pickup unit for capturing the image of an object in accordance with the external operations inputted through the operation input unit while the camera is in the normal mode; a recorder for recording the image captured by the image pickup unit in accordance with the external operations inputted through the operation input unit while the camera is in the normal mode; a playback unit for at least playing back image information that is recorded on the recording medium in accordance with the external operations inputted through the operation input unit while the camera is in the normal mode; and a function tester for testing functions of at least one of the operation input unit, the image pickup unit, the recorder, and the playback unit, when the function diagnosis mode is selected by the mode selector.

In another aspect, the present invention provides an electronic camera having a plurality of functions including capturing and recording images, the electronic camera including a mode selector externally switchable to select one of an operation explanation mode, a function diagnosis mode, and a normal mode; an operation input unit for inputting external operations that initiate corresponding functions of the camera while the camera is in the normal mode; an image pickup unit for capturing the image of an object in accordance with the external operations inputted through the operation input unit while the camera is in the normal mode; a recorder for recording the image captured by the image pickup unit in accordance with the external operations inputted through the operation input unit while the camera is in the normal mode; a playback unit for at least playing back image information that is recorded on the recording medium in accordance with the external operations inputted through the operation input unit while the camera is in the normal mode; and a function tester for testing functions of at least one of the operation input unit, the image pickup unit, the recorder, and the playback unit, when the function diagnosis mode is selected by the mode selector, wherein if the operation explanation mode is selected at the mode selector, the playback unit plays back an operation guide that is pre-stored in a memory, the operation guide explaining at least one of the camera operations and functions thereof.

In another aspect, the present invention provides an electronic camera including a means for operation input by which the camera operations are input externally; an image-receptor that takes a picture of the subject and creates images in correspondence to the image-reception operation of the camera received by said means of operation input; a recording means that records the image created by said means of image-reception on a recording medium; a means of playback that plays back the image that is recorded on the recording medium in correspondence to the playback operation of the camera received by said means of operation input; and a means of mode selection that selects an operation instruction mode through the operation of an external mode selection wherein in the state that the operation instruction mode is selected, when the camera operation is obtained by said means of operation input, said means of playback replays a guide that is provided in advance for the purpose of explaining the camera operation In another aspect, the present invention provides an electronic camera including an image-receptor means that takes pictures of the subject and creates images; a recording means that records the image created by said image-receptor means on a recording medium; a playback means that plays back the image that is recorded on the recording medium; a mode selection means that selects a function diagnosis mode by an external selection operation of function diagnosis mode; and an test-of-action means that carries out a test of the action of each function of the camera when the function diagnosis mode is selected by said mode selection means.

In another aspect, the present invention provides an electronic camera having a plurality of functions including capturing and recording images, the electronic camera including means for inputting external operations that designate corresponding functions of the camera to be performed; means for capturing an image of an object; means for recording the image captured by the capturing means on a recording medium; means for playing back image information that is recorded on the recording means; and means for selecting one operation mode of the camera from a plurality of available operation modes that include an operation explanation mode, wherein if the operation explanation mode is selected at the selecting means, the playback means plays back an operation guide that is pre-stored in a memory, the operation guide explaining at least one of the external operations and corresponding camera functions thereof.

In a further aspect, the present invention provides an electronic camera, including means for capturing an image of an object; means for recording the image captured by the capturing means on a recording medium; means for playing back image information that is recorded on the recording medium; means for selecting a function diagnosis mode; and means for testing functions of the camera if the function diagnosis mode is selected by the selecting means.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

First Preferred Embodiment

Figure 1:
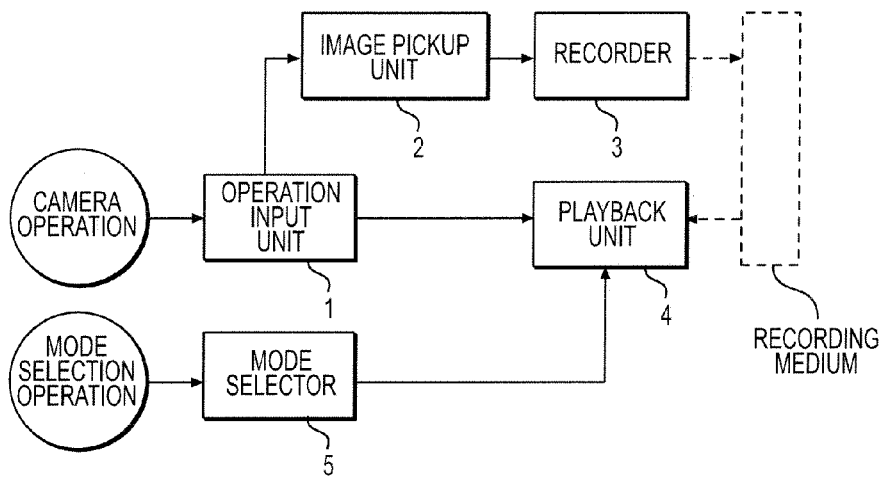
FIG. 1 is a block diagram illustrating operation of a first preferred embodiment of the present invention.

FIG. 1 shows a block diagram illustrating operation of an electronic camera according to a first preferred embodiment of the present invention. The electronic camera according to the first preferred embodiment includes an instruction input unit 1 (or operation input unit), through which an instruction for the camera operation is externally inputted, and an image pickup unit 2 for capturing the image of an object in accordance with the instruction received by the instruction input unit 1. The electronic camera further has a recorder 3 for recording the image captured by the image pickup unit 2 on a recording medium, a playback section 4 for reproducing the image recorded on the recording medium in accordance with the instruction received by the instruction input unit 1, and a mode selector 5 for selecting operation modes including an operation explanation mode (or operation or function instruction mode). If the operation explanation mode is selected at the mode selector, the playback section 4 displays the pre-stored explanation of the camera operation that corresponds to the instruction received by the instruction input unit 1.

Figure 2:
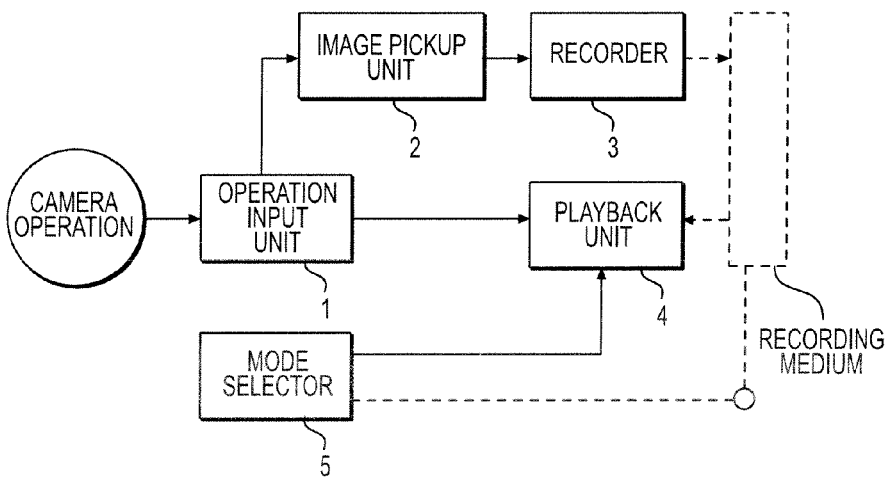
FIG. 2 is a block diagram illustrating operation of another example of a first preferred embodiment of the present invention.

FIG. 2 shows another example of the electronic camera according to the first embodiment of the present invention. In this electronic camera, data for explaining the camera operations are pre-stored on a recording medium that is detachable from the main body of the camera, and a mode selector 5 selects operational modes including an operation explanation mode when the recording medium is attached to the main body of the camera.

In the electronic camera of FIG. 1, when an instruction to take pictures is input through the instruction input unit 1 by an operator, the image pickup unit 2 starts capturing the images of an object in accordance with the instruction ("image pickup operation"), and recorder 3 records the image created by the image pickup unit 2 on the recording medium.

The playback section 4 reproduces the image recorded on the recording medium according to an display instruction ("display operation"). The reproduction operation is performed when an instruction to reproduce images is input through the instruction input unit 1, for example.

When an operator selects an operation explanation mode through the mode selector 5, the electronic camera enters the operation explanation mode. In the operation explanation mode, whenever a camera operation is carried out, an explanation of that camera operation (referred to as "operation guide") is reproduced. This operation guide may be in the form of an image and/or sound.

In the electronic camera of FIG. 2, the operation guide is pre-stored on a detachable recording medium. When the recording medium is attached to the main body of the camera, the mode selector 5 has an additional option to select the operation explanation mode. The operation explanation mode may automatically be selected based on whether the operation explanation guide is recorded on the attached recording medium. Alternatively, the operation explanation mode may be initiated by detecting attachment of the recording medium, regardless of whether the operation explanation mode is selected or not at the mode selector 5.

Figure 3:
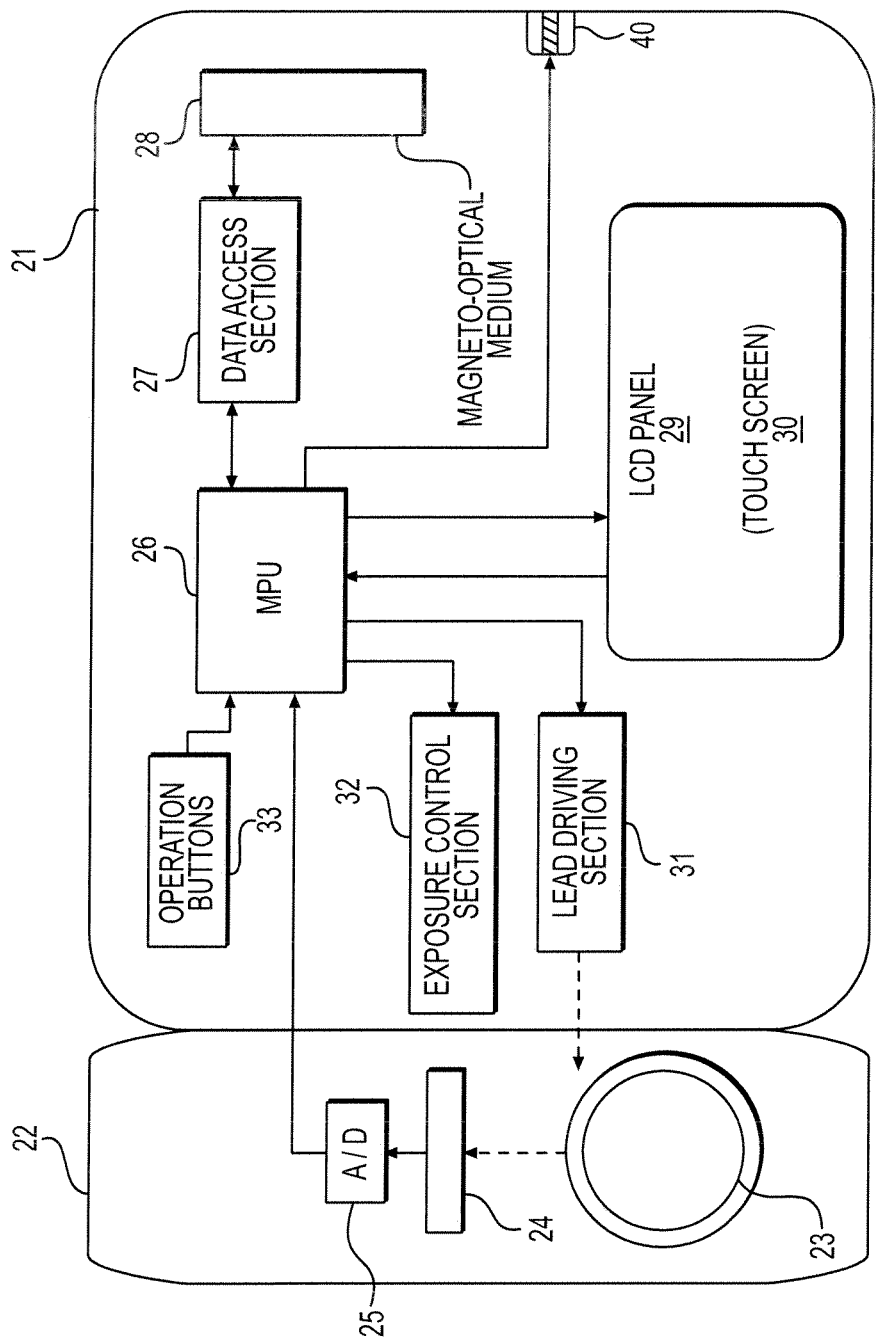
FIG. 3 is a structural block diagram illustrating a first preferred embodiment of the present invention.
Figure 4:
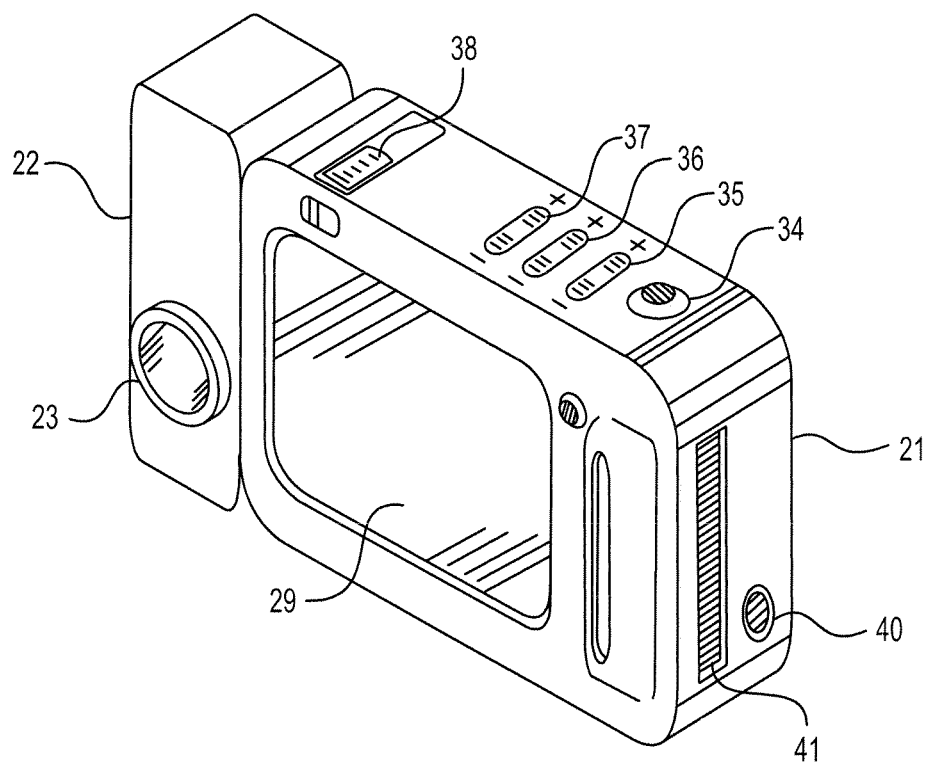
FIG. 4 is a perspective view of an electronic camera according to a first preferred embodiment of the present invention.

FIG. 3 shows a structural block diagram of an example of the present embodiment. FIG. 4 shows perspective views of the electronic camera according to the present example. As shown in FIG. 3, a main body 21 is accompanied by a camera part 22. In the camera part 22, an imaging lens (or optical system) 23 is installed and an image pickup device 24 is arranged to receive light transmitted through the imaging lens 23. The image signal from the image pickup device 24 is supplied to a main processor unit (MPU) 26 via an A/D converter 25.

The MPU 26 is connected to a magneto-optical recording medium 28 via a data access section 27. This magneto-optical recording medium 28 is disc-shaped, randomly accessible, and is detachable from the main body 21, for example. In addition, the MPU 26 is connected to a liquid crystal display (LCD) panel 29 to display the image data output through the MPU 26. The LCD panel 29 has a touch screen 30 mounted therein, and pressing operations sensed by the touch screen 30 are supplied to the MPU 26 as positional information indicating the corresponding position in the screen. Furthermore, MPU 26 controls a lens driving section 31 and an exposure control section 32.

Various operation buttons 33 for selecting camera operations are connected to MPU 26. As shown in FIG. 4, the operation buttons 33 include an image pickup button 34, focus button 35, zoom button 36, exposure button 37, and a mode selection button 38. In addition, an auxiliary output terminal 40 and a magneto-optical drive 41 (MO drive) are arranged at the side of the camera.

The MPU 26 performs various functions including processing image data from the A/D converter 25 and the magneto-optical recording medium 28, and controlling the data access section 27, lens driving section 31, and the exposure control section 32. The functions of the MPU further include recognizing instructions (or operations) that are input through the touch screen 30 and operation button 33, creating the image to be displayed on LCD panel 29, and performing functions designated by the mode selection button 38 when the magneto-optical medium having images for explaining camera operations (referred to as "operation instruction image," corresponding to "operation guide" above) is inserted.

The correspondence between the electronic cameras described with reference to FIGS. 1 and 2 and the present example of FIGS. 3 and 4 is as follows. The operation recognition function of MPU 26, touch screen 30, and the operation buttons 33 collectively correspond to the instruction input unit 1. The imaging lens 23, image pickup device 24, A/D converter 25, and the signal processing function and control function of MPU 26 collectively correspond to the image pickup unit 2. The control function of MPU 26 and data access section 27 together correspond to the recorder 3. The control function and the image-creation function of MPU 26 and data access section 27 collectively correspond to the playback section 4. The mode selection function of MPU 26 and mode selection button 38 correspond to the mode selector 5.

Figure 5:
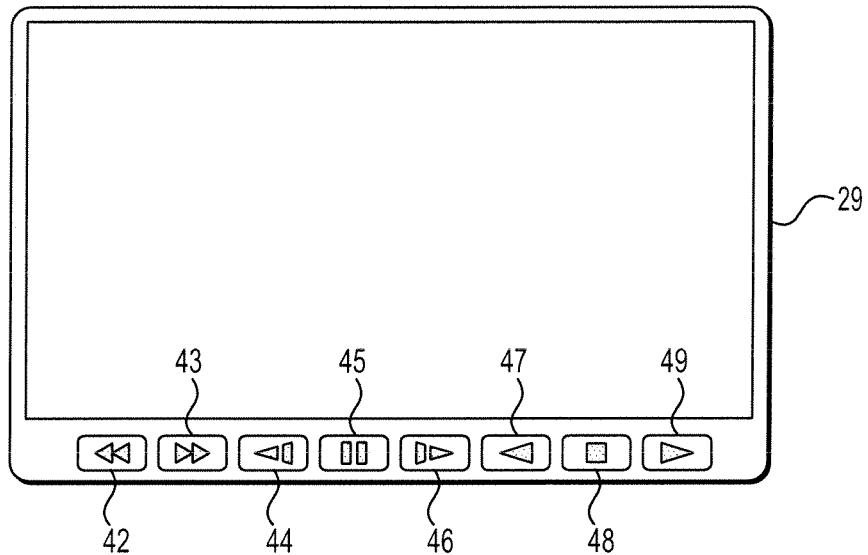
FIG. 5 shows a display panel screen of the electronic camera according to a first preferred embodiment of the present invention.

Operation of the present embodiment is described with reference to FIGS. 3 to 7B. First, the "Normal Mode" is described. When the normal mode is selected by mode selection button 38, MPU 26 enters the normal mode and accordingly the camera is set to the normal mode. In the normal mode, an initial screen shown in FIG. 5 is displayed on LCD panel 29. On the bottom portion of the screen, operation buttons for image playback are displayed. They are, from left to right, fast-reverse button 42, fast-forward button 43, frame-reverse button 44, pause button 45, frame-advance button 46, reverse-play button 47, stop button 48, and play button 49. The operations of these buttons are performed through touch screen 30. This type of user interface is well-known as a graphical user interface (GUI). That is, operation buttons are displayed on LCD panel 29 as objects, and MPU 26 responds to operator's touching (or pressing) activities of these objects and reads out corresponding image data and displays them on the LCD panel.

Figure 7A:
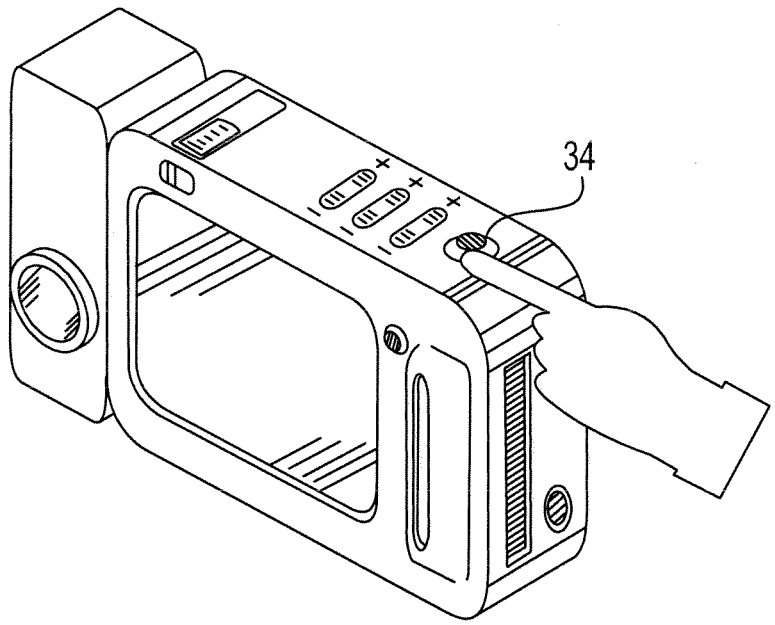
FIGS. 7A and 7B show perspective views of an electronic camera in a normal mode and an operation explanation mode, respectively, according to a first preferred embodiment of the present invention.

In the normal mode, normal actions are carried out by the operations of operation buttons 33 and the operation buttons that are displayed on the screen for image playback. For example, when image pickup button 34 is pressed, image pickup device 24 performs the photo-electric conversion of the image of the object obtained through imaging lens 23, and as a result, the photo-electric signal is converted to a digital signal through A/D converter 25. In addition, at MPU 26, image processing operations, such as gamma correction, outline enhancement, and white balance adjustments, are conducted and the resultant data are compressed and encoded. The encoded image data are recorded in an image file on the magneto-optical recording medium 28 via data access section 27 (FIG. 7A).

When focus button 35, zoom button 36, and exposure button 37 are operated, MPU 26 recognizes their operations and accordingly controls the lens driving section 31 and exposure control section 32 to conduct focus adjustment, zoom control, and exposure adjustment, respectively.

In addition, when an operation button for image playback is operated, MPU 26 reads out images from magneto-optical recording medium 28 and plays them back. For example, when fast forward button 43 is pressed, MPU 26 creates display images in which some of the frames are dropped and displays them on LCD panel 29.

Next, the "Operation Instruction Mode" is explained. Suppose a magneto-optical recording medium 28 has the operation instruction images stored thereon for explaining the operations of operation buttons 33 and the operations of operation buttons for image playback. The information that indicates whether the operation instruction images are stored or not in the disc is recorded in the system region of magneto-optical recording medium 28 as a characteristic attribute of the disc. If the disc contains the operation instruction images, they are stored as separate image files for each operation button. Identification data that uses the name of each operation button as its identification name is stored in the file label of each image file.

When this magneto-optical recording medium 28 is attached at MO drive 41, MPU 26 accesses the system region and detects whether operation instruction images exist using the characteristic attribute of the disc. When operation instruction images exist, MPU 26 selects the operation instruction mode and the camera is automatically set to an operation instruction mode.

In a read only memory (ROM) inside MPU 26, a sequence program for operation instruction mode is stored. This program is read out and MPU 26 conducts the appropriate actions, as follows.

During the operation instruction mode, assume that image pickup button 34 is pressed, for example. MPU 26 recognizes the operation (See FIG. 6, Step 1 (S1)) and accesses the file label that has "image pickup button" as its identification name via data access section 27.

In the file label, the relative address indicating the location of operation instruction image data for the image pickup button is stored. This address is used to seek the image data.

Figure 6:
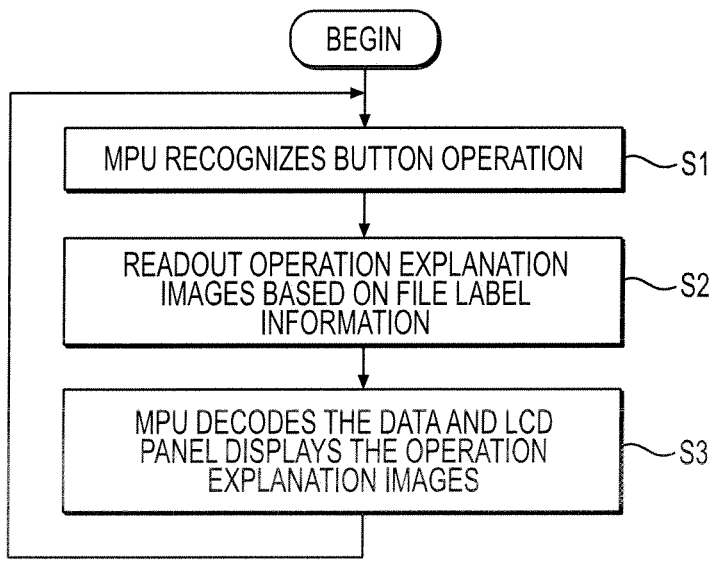
FIG. 6 shows a flow chart illustrating actions of an operation instruction mode according to a preferred embodiment of the present invention.
Figure 7B:
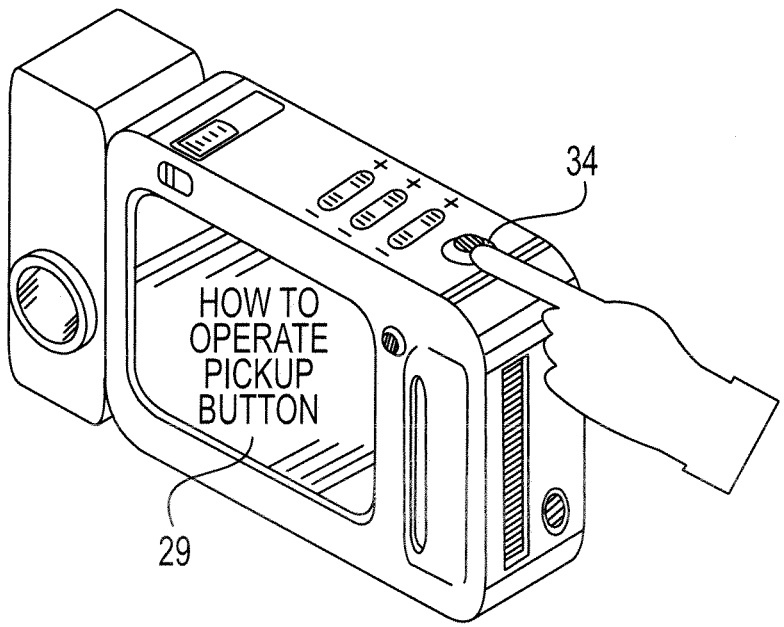

When the operation instruction image of image pickup button 34 is found, MPU 26 reads out these image data, decodes, and displays them on LCD panel 29 (FIG. 6, Steps 2 and 3 (S2, S3)), as shown in FIG. 7B.

The contents of the operation instruction images are, for example, a visual image explanation of how to press the operation button and/or what kind of function will be carried out when the operation button is pressed.

Similarly, when other buttons: focus button 35, zoom button 36, exposure button 37, and the operation button for image playback, are pressed, operation instruction images that explain the corresponding button operation and/or function in the normal mode are played back.

Switching to the operation explanation mode may also be carried out by the mode selection operation of mode selection button 38. Further, it is possible to record photographic images in the remaining empty spaces of magneto-optical recording medium 28 in which operation instruction images are stored.

As described above, according to the electronic camera of the present embodiment, the operation instruction image about each operation button can be played back just by pressing an operation button. Therefore, without depending on the operation manual, even users with poor understanding of the camera operations can understand the camera operations and functions within a short period of time and can start using the camera efficiently.

In this embodiment, the operation instruction images of the present embodiment are moving images. However, they are not limited to moving images and it is possible to display texts for the operation instructions, for example. Alternatively, it is possible to give operation instructions through sound by storing sound data in magneto-optical recording medium 28.

Also, the recording medium is not limited to a magneto-optical recording medium. A magnetic recording medium (which is not limited to a disc form and includes a tape form, etc.), an optical recording medium, or a semiconductor recording medium (memory card, etc.) can be used as well.

Figure 8:
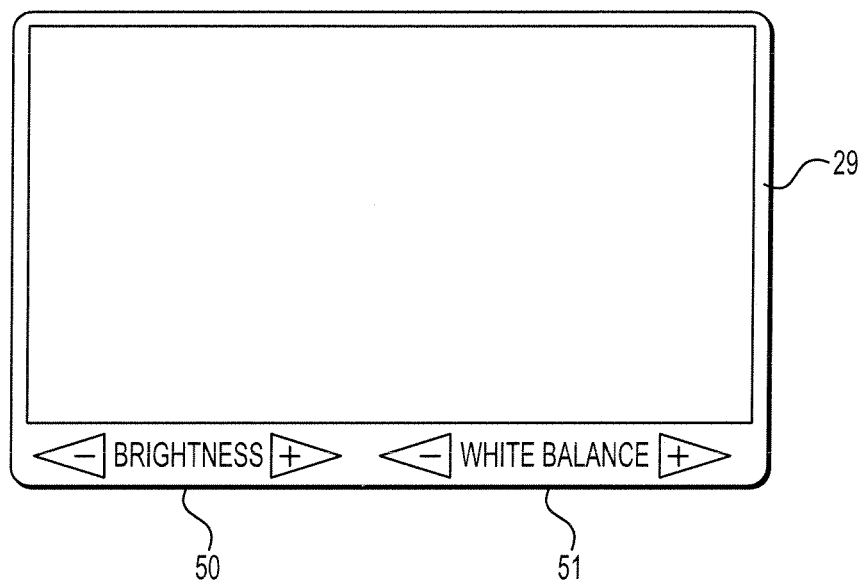
FIG. 8 indicates another display panel screen according to a preferred embodiment of the present invention.

Furthermore, it is possible to play back the operation instruction images for the operations of the image adjustment buttons, such as brightness adjustment button 50 and white balance adjustment button 51, as shown in FIG. 8. During display of such information, it is possible to display a sample image and actually adjust the quality of the sample image in correspondence to the operation of the image adjustment buttons. By doing this, the operator can learn the operation of the image adjustment as she experiences it.

Auxiliary output terminal 40 is a terminal for outputting images to other devices, such as personal computers. Using the auxiliary terminal 40, it is possible, for example, to play back operation instructions images on an external terminal or display.

In the present embodiment, one set of operation instruction images are used for each instruction. However, the invention is not limited to this. It is possible to have an operation instruction mode that stores multiple sets of operation instruction images (for example, instruction through moving images, instruction through texts, instruction through sound, instruction in English, Japanese, or other languages) on the recording medium so that the operator can select desirable ones from them. Also, if sequence programs of the operation instruction mode are stored on the same recording medium as the operation instruction image, the operation instruction images and the sequence programs of the operation instruction mode can be changed at the same time.

Moreover, in this embodiment, the operation instruction images may be stored on detachable magneto-optical recording medium 28. However, the invention is not limited to this and it is possible to store the operation instruction images in an internal memory of the camera main body, for example.

In this embodiment, MPU 26 may automatically select the operation instruction mode when magneto-optical recording medium 28 having operation instruction images is attached. However, the invention is not limited to this and it is possible to design the camera so that if there is no operation instruction image stored in a disc, then the camera cannot be switched to the operation instruction mode. Furthermore, it is possible to not only automatically select the operation explanation mode but also automatically playback the operation instruction images explaining overall operations and/or functions of the electronic camera. For example, general instructions for the camera functions or instructions about the photographic process are appropriate as the content of the operation instruction images.

The electronic camera of FIG. 1 has an operation instruction mode in which when a camera operation is carried out, an operation instruction guide for that operation is played back. Therefore, the operator can understand the function of the camera efficiently and quickly without relying on the operation manual. In addition, even if the camera operation is complicated, users can learn the operation easily.

In addition, it is possible to even omit operation manuals, therefore eliminating the costs for operation manual production.

When a recording medium, on which guide images are stored, is attached, the electronic camera of FIG. 2 is automatically switched to an operation instruction mode. Therefore, it is possible to avoid mistakes or troubles in switching to the operation instruction mode.

As described above, the electronic camera of the present embodiment can be easily used by operators who are inexperienced with camera operations.

Second Preferred Embodiment

Figure 9:
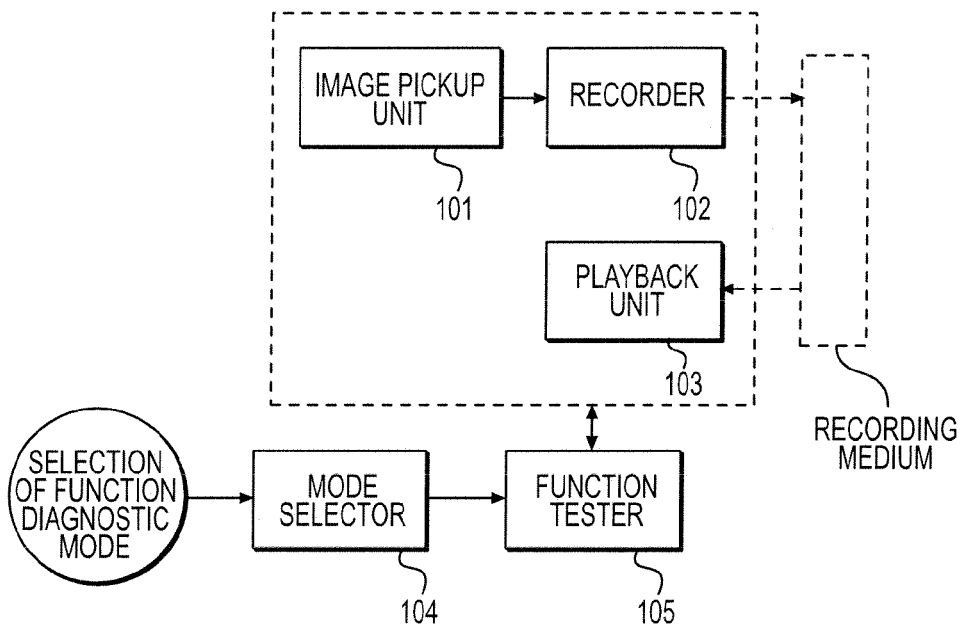
FIG. 9 is a block diagram illustrating operation of a second preferred embodiment of the present invention.

FIG. 9 shows a principle block diagram of an electronic camera according to a second preferred embodiment of the present invention.

The electronic camera of FIG. 9 has an image pickup unit 101 that captures the image of an object, and a recorder 102 that records the image generated by the image pickup unit 101 on a recording medium. Playback section 103 plays back the image that is recorded on the recording medium. Mode selector 104 can select a function diagnosis mode by an external selection operation. Function tester 105 tests each function of the camera when the function diagnosis mode is selected by mode selector 104.

Figure 10:
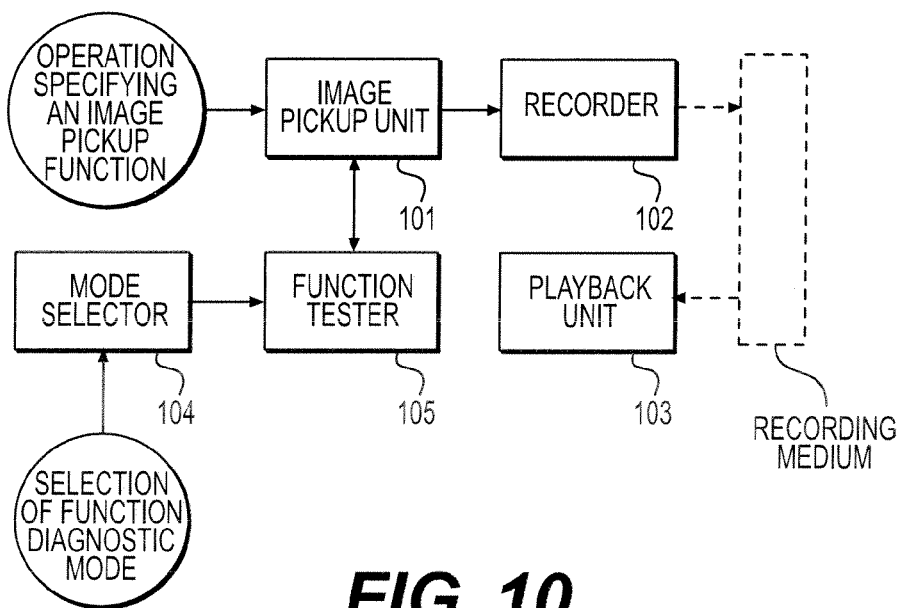
FIG. 10 is a block diagram illustrating operation of another example of a second preferred embodiment of the present invention.

FIG. 10 shows a principle block diagram of another example of the electronic camera according to the second preferred embodiment of the present invention. In the electronic camera of FIG. 10, an image pickup function of the image pickup unit 101 is selected in accordance with an external operation designating that function. The image pickup unit 101 captures images according to the selected function. When one of the image pickup functions at the image pickup unit 101 is selected while the camera is in the function diagnosis mode set by the mode selector 104, the function tester 105 tests the corresponding image pickup function.

Figure 11:
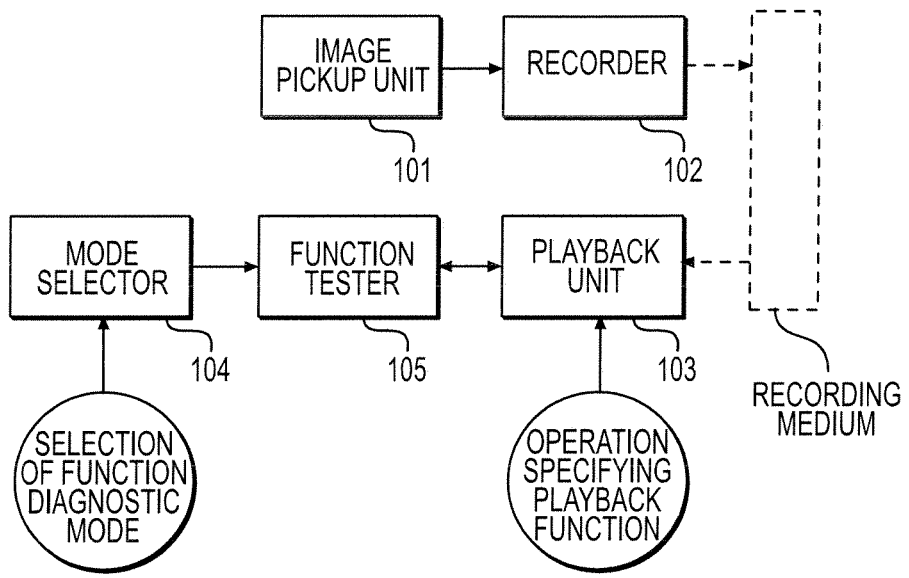
FIG. 11 is a block diagram illustrating operation of another example of a second preferred embodiment of the present invention.

FIG. 11 shows a principle block diagram of still another example of the electronic camera according to the second preferred embodiment of the present invention. In the electronic camera of FIG. 11, a playback function to be performed at the playback section 103 is selected by external operations, and the playback section 103 plays back images (which is recorded on the recording medium, for example) in accordance with the selected playback function. When one of the playback functions to be performed at the playback section 103 is selected through an external operation while the camera is in the function diagnosis mode, function tester 105 tests the corresponding playback function.

Figure 12:
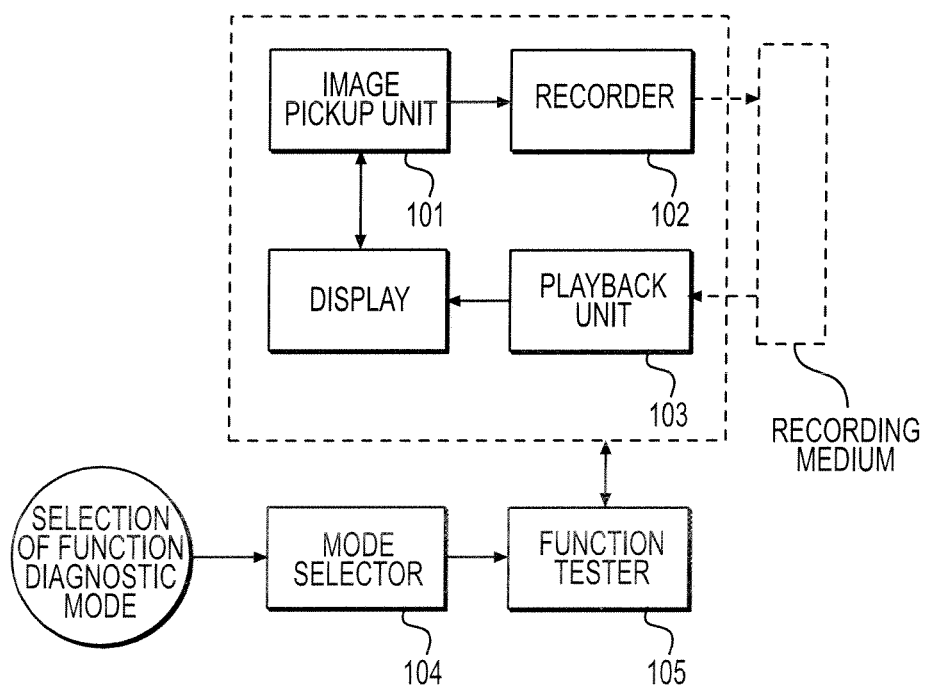
FIG. 12 is a block diagram illustrating operation of another example of a second preferred embodiment of the present invention.

FIG. 12 shows a principle block diagram of still another example of the electronic camera according to the second embodiment of the present invention. In the electronic camera of FIG. 12, the function tester 105 displays the test results on a display screen that is also used for displaying images through the playback section 3

In the electronic camera of FIG. 9, the image pickup unit 101 takes a picture of an object and creates an image. The recorder 102 records the image created by image pickup unit 101 on a recording medium. Playback section 103 plays back the image recorded on the recording medium. When an operator selects the function diagnosis mode through the mode selector 104, the electronic camera is set to the function diagnosis mode. Then, function tester 105 automatically carries out predetermined function (performance) tests for each function of the camera.

According to the electronic camera of FIG. 10, an image pickup function can be selected through external operations by an operator, and the image pickup unit 101 captures images in accordance with the selected image pickup function. When one of the image pickup functions is selected while the camera is set to the function diagnosis mode, function tester 105 performs predetermined tests with respect to the corresponding image pickup function. Therefore, with the electronic camera of FIG. 10, the function of the camera that is designated by the operator is selectively tested.

With the electronic camera described in FIG. 11, a playback function is selected by an external operation, and playback section 103 plays back images in a condition corresponding to the selected playback function (normal play, fast forward, etc.).

When the camera is in the function diagnosis mode and a playback function is designated, function tester 105 performs predetermined tests for the playback function. Therefore, the electronic camera of FIG. 11 selectively tests the playback function that is designated by the operator.

With the electronic camera described in FIG. 12, function tester 105 performs predetermined tests for all or a certain group of functions of the camera, and displays the test results (whether each function of the camera is normal, for example)

on the display screen (a screen also used for playback section 103 to play back and/or display the image).

Figure 13:
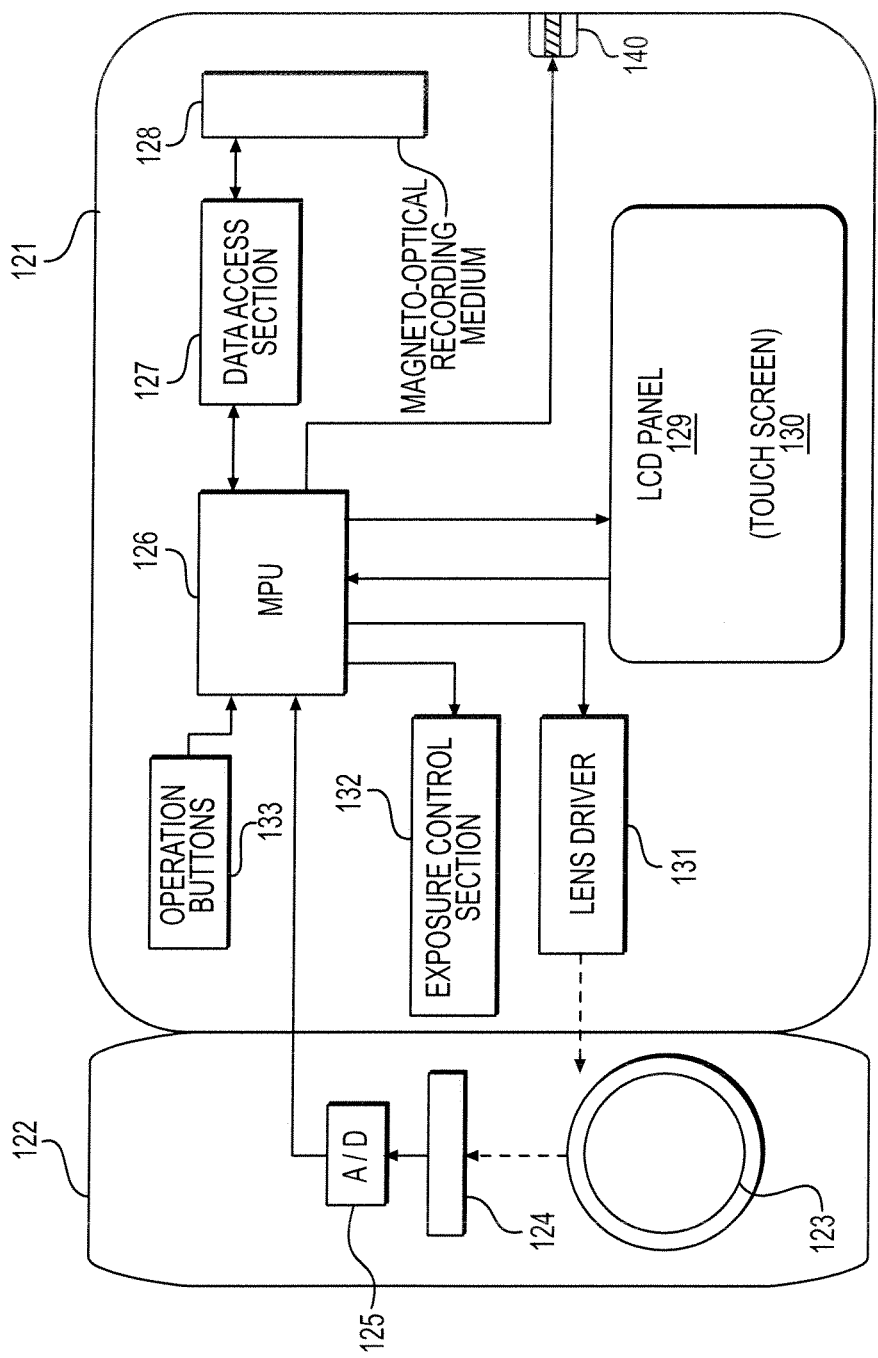
FIG. 13 shows a structural block diagram illustrating a second preferred embodiment of the present invention.
Figure 14:
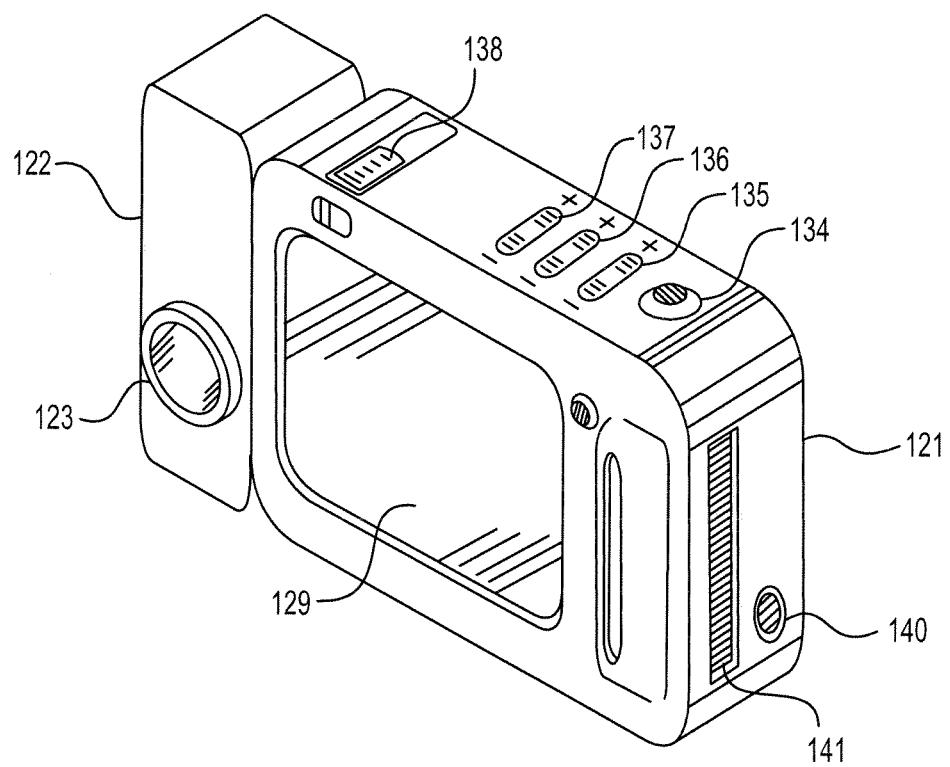
FIG. 14 is a perspective view of an electronic camera according to a second preferred embodiment of the present invention.

FIG. 13 is a structural block diagram of the electronic camera according to the present embodiment. FIG. 14 is a perspective view of the electronic camera of FIG. 13.

Referring to FIG. 13, main body 121 is attached to a camera part 122. Imaging lens 123 (or optical system) is installed in the camera part 122, and an image pickup device 124 is arranged to detect light transmitted through the imaging lens 123. The image signal from image pickup device 124 is input into MPU 126 via A/D converter 125.

MPU 126 is connected to magneto-optical recording medium 128 via data access section 127. The magneto-optical recording medium 128 has a disc-shape or the like, for example, and may be detachable from main body 121. Also, it is possible to conduct random access on the recording medium 128.

Image signals output from MPU 126 are supplied to an LCD panel 129. The LCD panel 129 has a touch screen 130 mounted thereon, and a pressing operation sensed by touch screen 130 is supplied to MPU 126 as positional information indicating the corresponding position in the screen. The control signals output from MPU 126 are supplied to lens driving section 131 and exposure control section 132.

Various operation buttons 133 are installed in the main body 121 and connected to MPU 126. Examples of operation buttons are shown in FIG. 14. From right to left, an image pickup button 134, focus button 135, zoom button 136, exposure button 137, and a mode selection button 138 are installed at the top plate of main body 121. In addition, an auxiliary output terminal 140 and an MO drive 141 are installed at the side panel of the camera.

MPU 126 has an image signal processing function for processing the image signals from A/D converter 125 and the image signals read out from magneto-optical recording medium 128, and a control function for controlling data access section 127, lens driving section 131, and exposure control section 132. MPU 126 further has an instruction (operation) recognition function that recognizes the instructions (operations) that are input through touch screen 130 and operation buttons 133, an image creation function that creates the image that is displayed on LCD panel 129, a mode selection function that conducts mode selection designated by mode selection button 138, and the diagnostic function that conducts the diagnosis of each function of the camera.

The correspondence between the electronic camera of FIG. 9 and the present example is as follows. Image pickup section 101 corresponds to imaging lens 123, image pickup device 124, A/D converter 125, and the signal processing function of MPU 126. Recorder 102 corresponds to the control function of MPU 126 and data access section 127. Playback section 103 corresponds to the signal processing function, controlling function, and image creation function of MPU 126 and data access section 127. Mode selector 104 corresponds to the operation recognition function and mode selection function of MPU 126. Function tester 105 corresponds to the signal processing function, controlling function, and the diagnostic function of MPU 126.

In addition to the correspondence described above, in the electronic camera of FIG. 10, the image pickup device 101 in FIG. 10 corresponds to the controlling function and the operation-recognition function of MPU 126.

In the electronic camera of FIG. 11, in addition to the correspondence described above, playback section 103 corresponds to the operation-recognition function of MPU 126.

In the electronic camera of FIG. 12, in addition to the correspondence described above, function tester 105 corresponds to the image creation function of MPU 126.

Operation of the present embodiment is described with reference to FIGS. 13 to 16B as follows. First, the "Normal Mode" is described. An electronic camera according to the present embodiment can be switched to a "Normal Mode" similar to that for the above-mentioned first preferred embodiment by operating the mode selection button 138. In the normal mode, the initial screen similar to that of FIG. 5 is displayed on LCD panel 129, for example. As shown in FIG. 5, a plurality of operation buttons for image playback are displayed on the bottom portion of the screen.

In addition, the electronic camera of the present embodiment may be equipped with a button for reading out an image quality adjustment screen (the button is not shown in the figure). When the button is pressed, the image quality adjustment screen (the one shown in FIG. 8, for example) is displayed on LCD panel 129.

These operation buttons can be operated through touch screen 130 utilizing a known technology, such as a GUI (Graphical User Interface). That is, on LCD panel 129, operation buttons are displayed as objects, and MPU 126 senses operator's touching activities of these objects and accordingly plays back and adjusts the image.

In the normal mode, normal actions are carried out by the operation of operation buttons 133 and the operation buttons for image playback, 42 to 49 of FIG. 5, and image quality adjustment buttons 50 and 51 of FIG. 8.

Figure 16A:
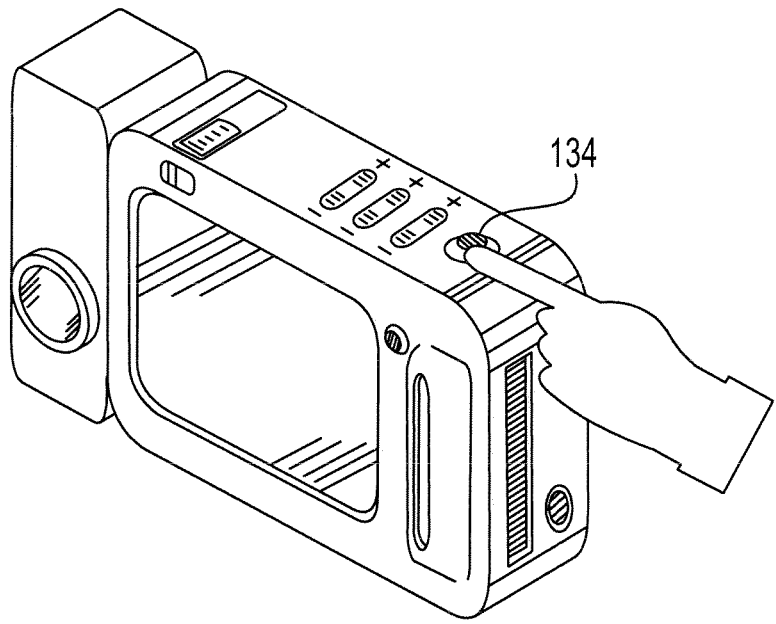
FIGS. 16A and 16B show perspective views of an electronic camera in a normal mode and a function diagnosis mode, respectively, according to a second preferred embodiment of the present invention.

For example, when image pickup button 134 is pressed, image pickup device 124 performs a photo-electric conversion of the image of an object obtained through the imaging lens 123, and accordingly the photo-electric signal is converted into a digital signal through A/D converter 125. In addition, at MPU 126, image processing, such as gamma correction, outline enhancement, and white balance adjustments, is conducted and the resultant data are then compressed and encoded. The encoded image data are recorded in an image file on magneto-optical recording medium 128 via data access section 127 (FIG. 16A).

When focus button 135, zoom button 136, or exposure button 137 is operated, MPU 126 recognizes that operation and controls lens driving section 131 and exposure control section 132 to conducts focus adjustment, zoom control, or exposure adjustment, respectively.

In addition, when the operation buttons 42 to 49 (FIG. 5) for image playback are operated, MPU 126 reads out images corresponding to the selected operation from magneto-optical recording medium 128 and plays them back. For example, when fast forward button 43 (FIG. 5) is pressed, MPU 126 creates moving display images in which some of the frames are dropped, and displays them on LCD panel 129.

Furthermore, when brightness adjustment button 50 or white balance adjustment button 51 (FIG. 8) are pressed, MPU 126 conducts gain control of the photographic image, brightness control of the playback image, and the color signal control, etc., in accordance with the selected operation.

Next, the "Function Diagnosis Mode" is explained. When the electronic camera of the present embodiment is switched to the function diagnosis mode by mode selection button 138, the camera is set to the function diagnosis mode. In this mode, predetermined tests are carried out for each function of the camera corresponding to the respective operation button. This test may be carried out with a sequence program stored in the internal ROM of MPU 126.

Figure 15:
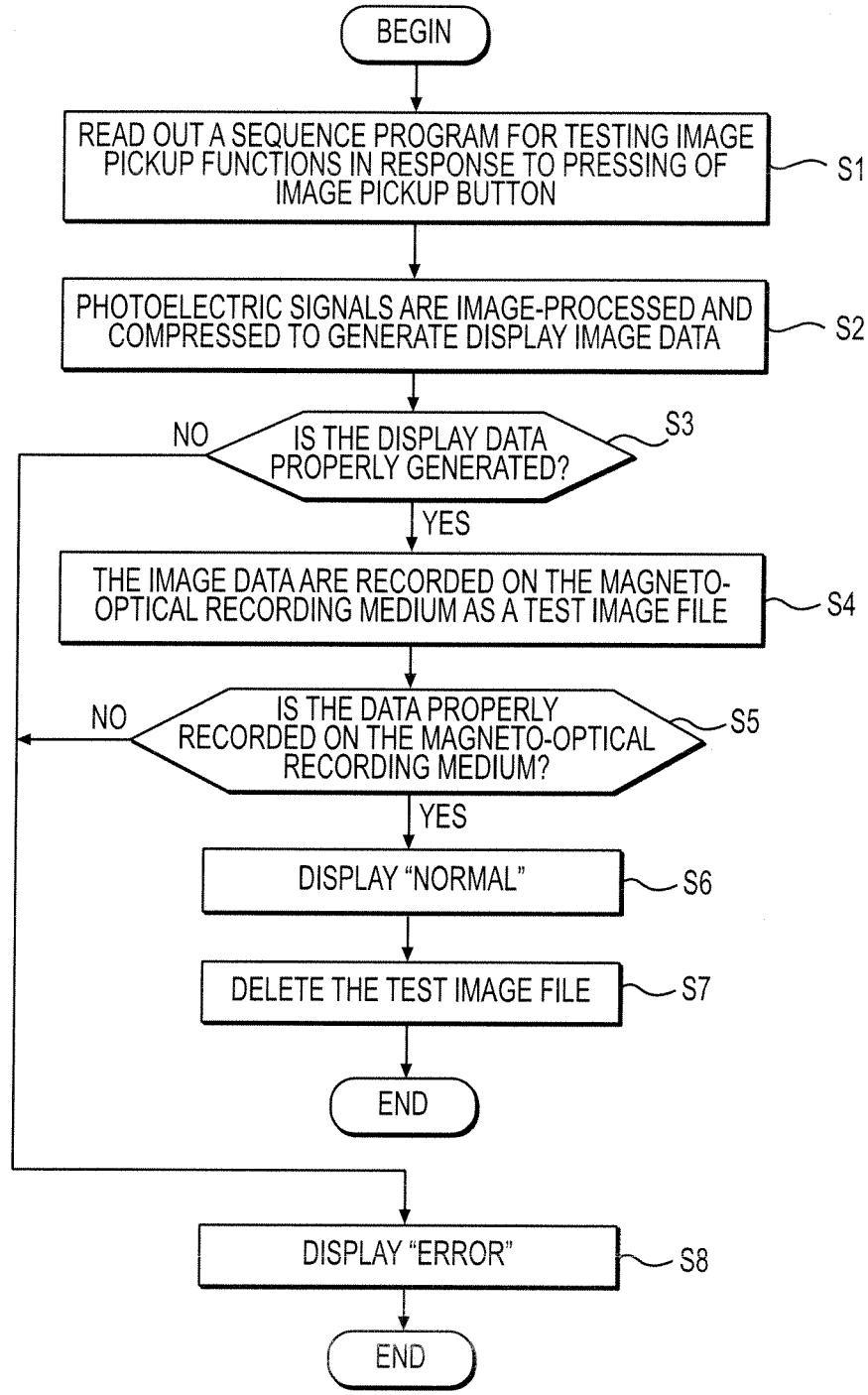
FIG. 15 shows a flow chart illustrating operation of an MPU during the diagnostics mode according to a preferred embodiment of the present invention.

For example, when the image pickup button 134 is pressed, MPU 126 recognizes that action and reads out a sequence program for testing the corresponding image pickup function (FIG. 15, Step S1). MPU 126 accordingly carries out the following tests for the image pickup function.

Figure 16B:
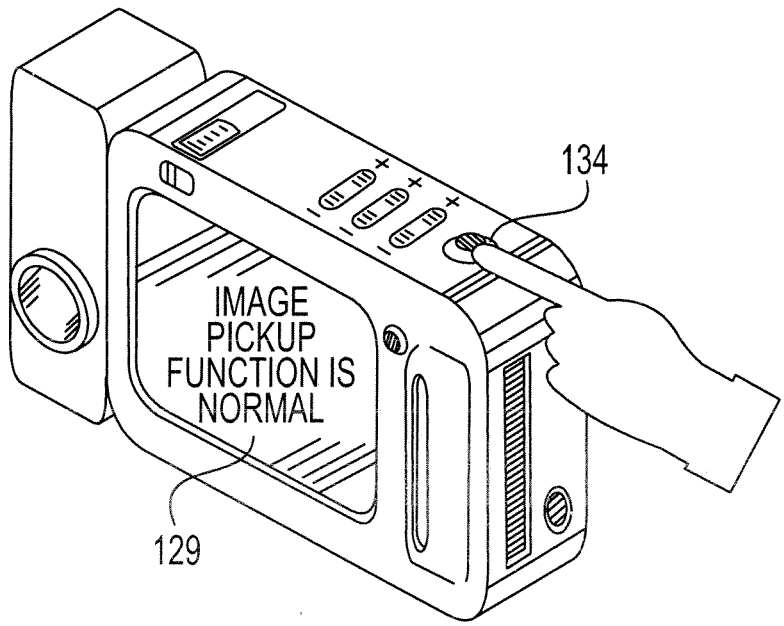

First, the image of an arbitrary object is captured through the imaging lens 123 for a predetermined period of time. Then, the image is compressed and encoded to generate image data (FIG. 15, Steps S2 and S3). The image data is recorded in a blank region of magneto-optical recording medium 128 as a test image file (FIG. 15, Steps S4 and S5). When the test image file is recorded on magneto-optical recording medium 128 and the test of the function is completed without abnormality, MPU 126 creates a message "The image pickup function is normal." and displays it on LCD panel 129 (FIG. 15, Step S6), as shown in FIG. 16B. Finally, MPU 126 accesses the file label of the test image file via data access section 127 and deletes the test image file by rewriting the file attribute to an overwritable attribute (FIG. 15, Step S7).

If there is abnormality in the image pickup function, e.g., the subject images are not converted to the image data or the test image file is not recorded properly, MPU 126 displays a message "There is a problem with the image-pickup function" (FIG. 15, Step S8) and aborts the test.

When zoom button 136 is pressed, MPU 126 recognizes that action and tests the zooming function with a sequence program. MPU 126 drives imaging lens 123 from the maximum telephoto view to the maximum wide-angle view via lens driving section 131, for example. The design lens positions of the lens at the maximum telephoto view and maximum wide-angle view and the design duration of the zooming from the maximum telephoto view to the maximum wide-angle view are pre-stored in the internal ROM of MPU 126. By comparing and analyzing the stored design data with the actual lens positions and actual zoom duration that are measured by a zoom encoder, whether the zooming action was carried out properly can be determined. If the zooming action is conducted properly, MPU 126 displays a message "The zoom function is normal" on LCD panel 129.

If there are some problems during the zooming test action: e.g., the lens is not driven from the maximum telephoto view to the maximum wide-angle view, or the zooming speed is slow, a message "There is a problem with the zoom function" is displayed on LCD panel 129 and the testing action is aborted.

Moreover, when playback button 49 (FIG. 5) is pressed, MPU 126 recognizes the operation and the playback function is tested with a sequence program for testing the playback function. In the blank region on magneto-optical recording medium 128, sample image files are pre-stored. MPU 126 accesses the file label and searches for the sample image file via data access section 127. Then, MPU 126 reads out the sample image data via data access section 127, creates a display image, and displays it on LCD panel 129. When all the sample image data are read out and the playback action is completed without abnormality, MPU 126 displays a message "The playback function is normal" on LCD panel 129.

If there is abnormality during the test of the zooming action: e.g., the improper readout function of the image data or incomplete creation of the display image, then a message "There is a problem with the playback function" is displayed on LCD panel 129 and the test action is aborted.

Furthermore, when brightness adjustment button 50 (FIG. 8) is pressed, MPU 126 recognizes the operation, and with the sequence program, the following diagnosis is carried out.

In the blank region of the magneto-optical recording medium 128, sample image files are pre-stored. MPU 126 reads out the sample image data and displays it on LCD panel 129. Then, MPU 126 conducts gain control of the brightness within the range from 0 to 15 dB and creates images in which the brightness of the sample images are varied sequentially. Subsequently, LCD panel 129 displays the thus created sample images having brightness changed sequentially. When the test is completed without abnormality, MPU 126 displays a message "The brightness adjustment function is normal" on LCD panel 129.

When there are some problems with the gain control: e.g., the brightness fails to change by the predetermined design amount, a message "There is a problem with the brightness adjustment function" is displayed and the test is aborted.

As described above, according to the electronic camera of the present embodiment, various camera functions can be tested simply by pressing the respective operation buttons under the function diagnosis mode and each testing operation is automatic. Therefore, the operator can promptly confirm camera functions and can prepare for shooting pictures at ease.

The electronic camera according to the present invention also can be adapted to automatically test all the camera functions once the camera is switched to the function diagnosis mode by mode selection button 138. In this case, the results of the test may be used to determine the various statuses of the camera, the messages, such as "All the functions are normal," "There is some problem with the machine, however, you can take pictures," or "You cannot take pictures" may be displayed on the screen.

Also, the electronic camera according to the present invention can indicate not only whether the camera functions are normal, but also where the problem exists inside the camera.

In the present embodiment, messages indicating whether the camera is functioning normally are displayed on LCD panel 129. Alternatively, the results of the diagnosis may be output in the form of sound.

The recording medium above is not limited to the magneto-optical recording medium. It is possible to use a magnetic recording medium (which is not limited to a disc shape and includes a tape form, etc.), optical recording medium, or semiconductor recording medium (e.g., memory card).

The electronic camera described with reference to FIG. 9 can automatically test each function of the camera when the function diagnosis mode is selected. Therefore, the operator can, in advance, confirm whether the camera is working normally or not. Accordingly, the operator can prepare for shooting pictures at ease.

The electronic camera described with reference to FIG. 10 can test the image pickup function of the camera that is designated through an external operation. Therefore, the operator can easily and accurately determine whether the photographic function is normal.

The electronic camera described with reference to FIG. 11 can test the playback function of the camera that is designated by an external operation. Therefore, the operator can easily and accurately determine whether the image playback function is normal.

With the electronic camera described with reference to FIG. 12, the test results of each function are displayed on the display screen, and therefore the operator can easily check the diagnosis result.

As described above, according to the electronic camera of the present embodiment, users can check the camera's function in advance and therefore can relax and prepare for the shooting. In addition, if a problem is found, users can easily understand the location of the problem and accordingly can fix the problem easily.

It will be apparent to those skilled in the art that various modifications and variations can be made in the electronic camera of the present invention without departing from the spirit or scope of the invention. Thus, it is intended that the present invention cover the modifications and variations of this invention provided they come within the scope of the appended claims and their equivalents.

What is claimed is:

1. An electronic camera having a plurality of functions including capturing and recording images, comprising:
   an operation input unit for inputting external operations that designate corresponding functions of the camera to be performed;
   an image pickup unit for capturing an image of an object;
   a recorder for recording the image captured by the image pickup unit on a recording medium;
   a playback unit having a display for at least playing back image information that is recorded on the recording medium;
   a mode selector for selecting one operation mode of the camera from a plurality of available operation modes that include an operation explanation mode,
   wherein if the operation explanation mode is selected at the mode selector, the playback unit plays back on the display an operation guide that is pre-stored in a memory when an instruction is received by the operation input unit, the operation guide explaining at least one of the external operations of the operation input unit is not played back on the display, and corresponding camera functions thereof,
   wherein at least the operation input unit, the recorder, the display, and the mode selector are enclosed within a main camera body, and
   wherein the operation input unit is mechanically disposed within the main camera body; and
   a recording medium drive for driving a detachable recording medium,
   wherein the mode selector automatically selects the operation explanation mode in response to attachment to the recording medium drive of the detachable recording medium having the operation guide stored thereon.

2. The electronic camera according to claim 1, wherein the recorder records the image created by the image pickup unit on the detachable recording medium.

3. An electronic camera having a plurality of functions including capturing and recording images, the electronic camera comprising:
   a mode selector externally switchable to select one of an operation explanation mode, a function diagnosis mode, and a normal mode;
   an operation input unit for inputting external operations that initiate corresponding functions of the camera while the camera is in the normal mode;
   an image pickup unit for capturing the image of an object in accordance with the external operations inputted through the operation input unit while the camera is in the normal mode;
   a recorder for recording the image captured by the image pickup unit in accordance with the external operations inputted through the operation input unit while the camera is in the normal mode;
   a playback unit having a display for at least playing back image information that is recorded on the recording medium in accordance with the external operations inputted through the operation input unit while the camera is in the normal mode; and
   a function tester for testing functions of at least one of the operation input unit, the image pickup unit, the recorder, and the playback unit, when the function diagnosis mode is selected by the mode selector,
   wherein if the operation explanation mode is selected at the mode selector, the playback unit plays back an operation guide that is pre-stored in a memory, the operation guide explaining at least one of the camera operations and functions thereof and wherein at least the operation input unit, the recorder, the display, and the function tester are enclosed within a main camera body.

4. An electronic camera having a plurality of functions including capturing and recording images, comprising:
   an operation input unit for inputting external operations that designate corresponding functions of the camera to be performed;
   an image pickup unit for capturing an image of an object;
   a recorder for recording the image captured by the image pickup unit on a recording medium;
   a playback unit having a display for at least playing back image information that is recorded on the recording medium;
   a mode selector for selecting one operation mode of the camera from a plurality of available operation modes that include an operation explanation mode; and
   a recording medium drive for driving a detachable recording medium,
   wherein, if the operation explanation mode is selected at the mode selector, the playback unit plays back on the display an operation guide that is pre-stored in a memory, the operation guide explaining at least one of the external operations and corresponding camera functions thereof,
   wherein at least the operation input unit, the recorder, the display, and the mode selector are enclosed within a main camera body, and
   wherein the mode selector automatically selects the operation explanation mode in response to attachment to the recording medium drive of the detachable recording medium having the operation guide stored thereon.

5. The electronic camera according to claim 4, wherein the recorder records the image created by the image pickup unit on the detachable recording medium.

6. The electronic camera according to claim 4, wherein the operation input unit includes buttons or switches disposed on the main camera body of the electronic camera.

7. The electronic camera according to claim 6, wherein, in response to one of the buttons being pressed, an explanation of the function corresponding to the pressed button is displayed on the display.

8. The electronic camera according to claim 4, wherein the mode selector includes one of a button or a switch distinct from the buttons or switches of the operation input unit.

9. The electronic camera according to claim 4, further comprising a memory unit adapted to store the captured image information.

10. An electronic camera having a plurality of functions including capturing and recording images, comprising:
    an operation input unit configured to input operation instructions for operation functions of the camera;
    an image pickup unit configured to capture an image of an object;
    a playback unit having a display and configured to at least play back captured image information;
    a mode selector configured to select an operation mode of the electronic camera among a plurality of available operation modes, the available operation modes including at least an operation explanation mode, wherein, if the operation explanation mode is selected by the mode selector, the playback unit plays back a pre-stored operation guide on the display in response to the operation instruction being input by the operation input unit, such that the operation guide explains at least one of the operation functions corresponding to the operation instruction input by the operation input unit; and a recording medium drive configured to receive a detachable recording medium, wherein the mode selector automatically selects the operation explanation mode in response to the detachable recording medium, having the operation guide stored thereon, being attached to the recording medium drive.

* * * * *